May 16, 1939.　　　　　A. C. DAVIDSON　　　　　2,158,535
SHOCK ABSORBER
Filed May 8, 1936　　　　2 Sheets-Sheet 1
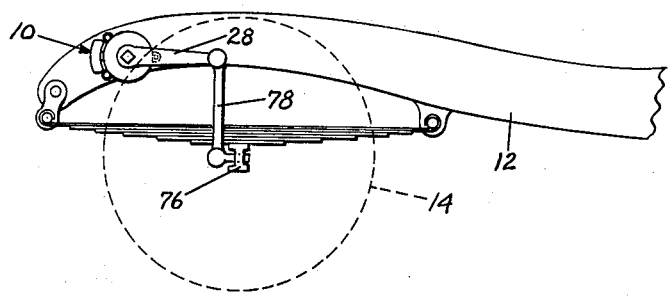
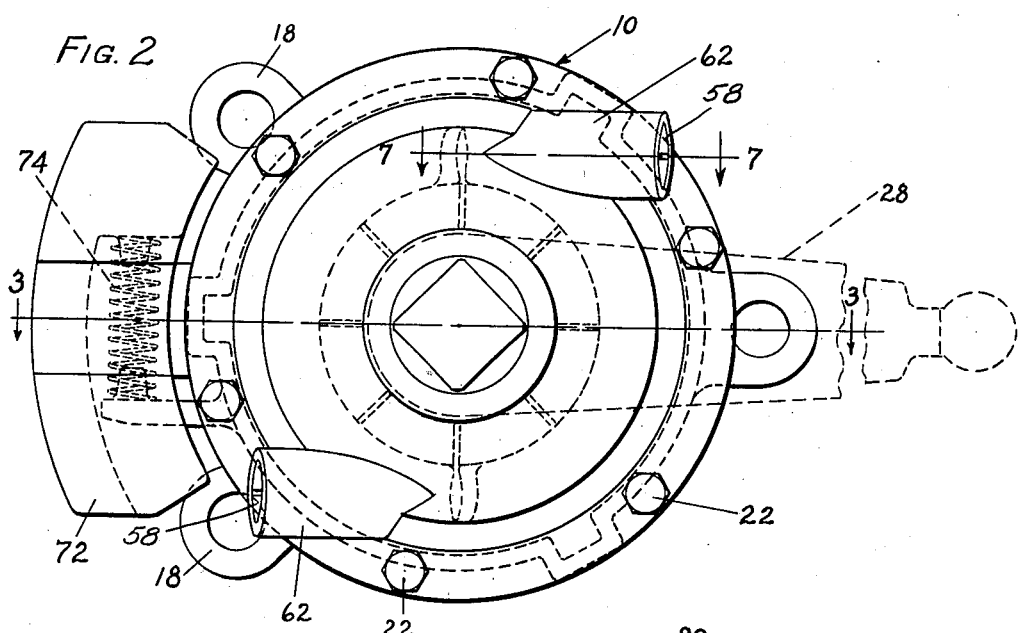
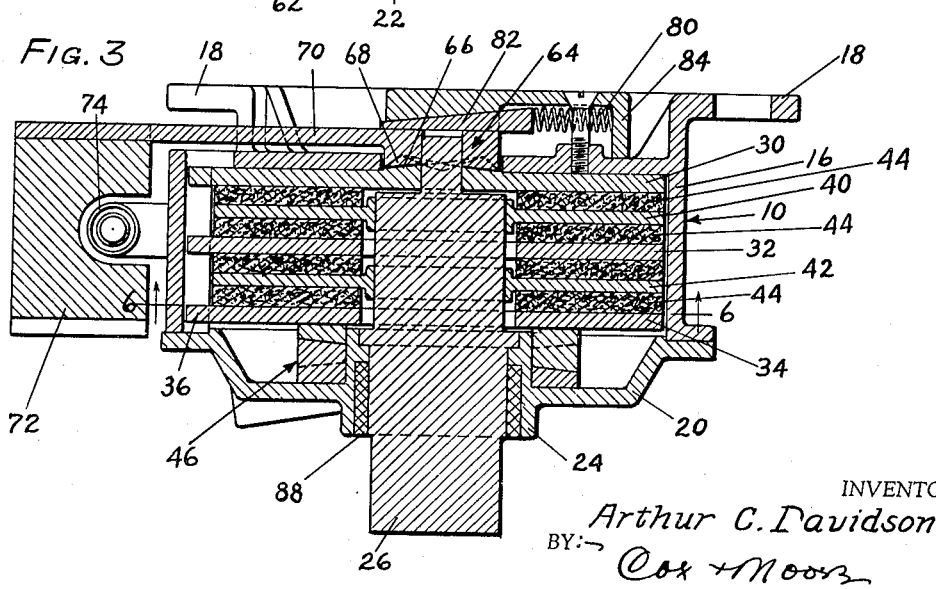
INVENTOR.
Arthur C. Davidson
BY: Cox + Moon
ATTORNEY.

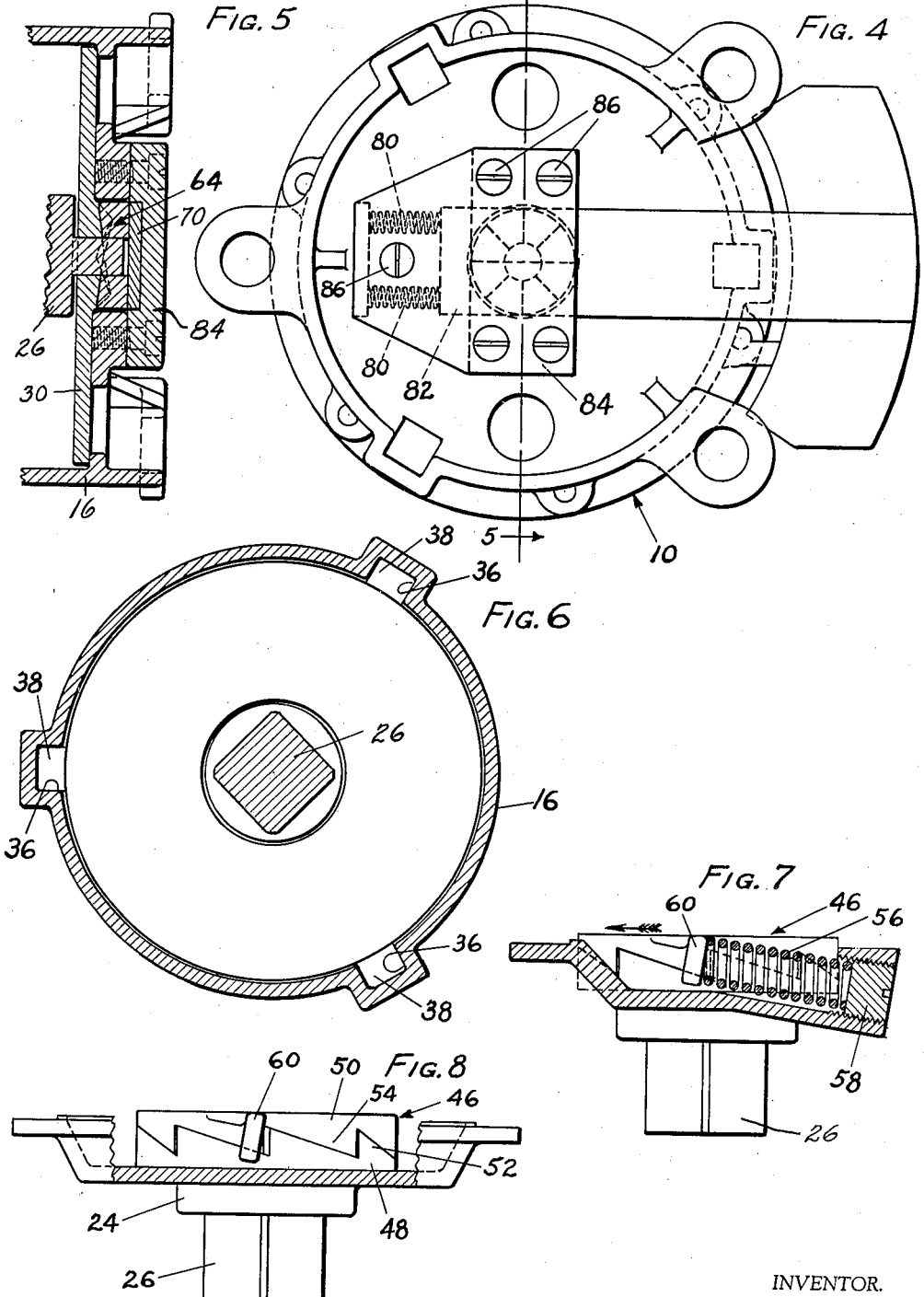

Patented May 16, 1939

2,158,535

UNITED STATES PATENT OFFICE 2,158,535

SHOCK ABSORBER

Arthur C. Davidson, Chicago, Ill.

Application May 8, 1936, Serial No. 78,738

14 Claims. (Cl. 188—130)

This invention relates generally to shock absorbers, and more particularly to shock absorbers of the type adapted for use on automobiles.

It is one of the primary objects of the present invention to provide a shock absorber of extremely simple yet durable construction which will more efficiently control the vertical movement of the automobile body under the severest operating conditions.

My invention contemplates a shock absorber which will enable the free movement of the road wheel of the car against a normal resistance within the shock absorber, and which will automatically establish an increase in resistance when the speed of the vertical movement of the car body is increased.

More specifically, my invention contemplates a shock absorbing device equipped with an effective inertia control mechanism, which depends for its functioning upon the speed of the vertical movement of the car body.

Another object of the invention is to provide a device, as set forth above, wherein the resistance to vertical movement of the car body may be adjusted in a very simple manner to compensate for wear or to adapt the device for use under predetermined load conditions.

Further, my invention contemplates the provision of a shock absorber of the general type referred to above, wherein frictional means in the form of relatively rotatable contacting elements, coupled with yieldable adjusting means, serve to effectively establish the required resistance to take up shocks.

The foregoing and numerous other objects and advantages will be more apparent from the following detailed description when considered in connection with the accompanying drawings, wherein—

Figure 1 is a side elevational view of a shock absorber constructed in accordance with the teachings of the present invention shown in operative association with the chassis of an automobile to more clearly illustrate the manner in which the device is operatively associated with an automobile;

Figure 2 is an enlarged side elevational view of the shock absorber proper shown in Figure 1;

Figure 3 is a horizontal transverse sectional view of the device taken substantially along the line 3—3 of Figure 2;

Figure 4 is a side elevational view of the device as seen from the rear of Figure 2;

Figure 5 is a central vertical transverse section taken substantially along the line 5—5 of Figure 4;

Figure 6 is a detail sectional view taken substantially along the line 6—6 of Figure 3;

Figure 7 is an enlarged detail view of the friction control mechanism and one of the coiled springs associated therewith, said view being taken substantially along the line 7—7 of Figure 2; and Figure 8 is a fragmentary elevational view of the control mechanism for governing the friction between the shock absorber disks, a portion of the housing being broken away to more clearly illustrate the friction adjusting cam mechanism.

Referring now to the drawings wherein like numerals have been employed to designate similar parts throughout the various figures, it will be seen that one practical embodiment of my invention includes a shock absorber, which I have designated generally by the numeral 10. As clearly illustrated in Figure 1, the shock absorber 10 is adapted to be conveniently secured to the side of an automobile chassis or frame 12. Each car is supplied with a set of four shock absorbers, one being companion to each wheel 14.

It will be noted that each of the shock absorbers 10 includes a housing 16 having three ears 18 formed integral therewith to facilitate application of the device to the supporting structure of an automobile, for example, the chassis 12 shown in Figure 1. The outer portion of the device 10 includes a cover or housing member 20, which is secured to the housing member or section 16 by means of screws 22. The central portion of the cover member 20 is provided with a bearing section 24, which is adapted to support a shaft 26. A portion of the shaft 26 projecting outwardly beyond the bearing section 24 is squared to facilitate the application thereto of a suitable operating arm or lever 28 indicated by full line in Figure 1 and dotted lines in Figure 2.

The inner extremity of the shaft 26 is reduced in diameter and mounted within a disk or plate 30 (Figure 3). Two other disks 32 and 34, which are companion to the disk or plate 30, are mounted within the housing 16. As clearly indicated in Figure 6, the housing 16 is provided with three equally spaced recesses 36, which are adapted to receive companion lugs 38 provided along the periphery of the plates or disks 30, 32, and 34. Thus these plates are secured against rotation within the housing. Interposed between the disks 30 and 32 and the disks 32 and 34 are rotary plates or disks 40 and 42, respectively. The disks 40 and 42 have central apertures which are square in cross section to conform with the square cross section of the shaft 26. Hence, these disks rotate as a unit with the shaft 26 and are adapted to be shifted axially along said shaft.

These rotary plates or disks 40 and 42 frictionally cooperate with annular disks 44. The annular disks 44 are preferably made of suitable brake lining material. From the foregoing description it will be apparent that, if sufficient frictional resistance is set up between the rotary disks 40—42, the disks 44 and the plates 30, 32, 34, rotation of the shaft 26 will be counteracted.

In order to establish the required frictional resistance between the above mentioned parts, I provide a cam mechanism designated generally by the numeral 46 (see particularly Figures 3, 7 and 8). This cam mechanism 46 includes a stationary cam member 48 integral with the cover 20 and non-rotatable therewith, and a complementary rotary cam member 50. Each of the cam members 48 and 50 are provided with ratchetlike cam teeth 52 and 54, respectively. Through the agency of coiled springs 56 acting between a screw plug 58 and a lug 60 formed integral with and extending outwardly from the periphery of the cam member 50, said cam member 50 is normally urged in a counterclockwise direction, as viewed in Figure 2 and as indicated by the directional arrow in Figure 7.

Rotation of the cam member 50 in a counterclockwise direction, as set forth above, causes the plate or disk 34 to be shifted inwardly, thereby effecting increased frictional resistance between all of the disks within the housing 16. I prefer to employ two oppositely disposed coiled springs 56 within tangentially extending tubular portions 62, as clearly shown in Figure 2, thereby causing balanced turning forces to act upon the cam member 50. Any wear which may be experienced by the disk members is automatically compensated for by the shifting of the cam member 51 through the action of the coiled springs 56.

The frictional resistance just described is sufficient to take care of normal vertical movements experienced by the automobile body. In order to increase the resistance set up by the shock absorber 10 when the automobile body experiences sudden vertical movement in either direction, I provide a second cam mechanism designated generally by the numeral 64 (Figures 3 and 5). The central portion of the plate 30 is formed with cam members or teeth 66, and complementary cam members or teeth 68 are provided upon the inner extremity of a cam arm 70 (Figure 3). The outer extremity of this arm 70 carries a suitable weight 72. It will be apparent that rotation of the arm 70 in either direction will cause the friction disks within the housing 16 to experience greater frictional contact, and hence will increase the frictional resistance to forces tending to rotate the shaft 26. A coiled spring 74 (Figures 2 and 3) is mounted within the confines of the weight 72 so as to resiliently resist the tendency for the weight to shift upwardly or downwardly. Should the vehicle with which the shock absorber is associated experience a sudden upward body movement, the inertia of the weight 72 tends to prevent the weight from moving upwardly, thereby causing relative rotation between the cam members 66 and 68. This causes the disks within the housing 16 to set up increased frictional resistance to the forces tending to rotate the shaft 26. As clearly indicated in Figure 1, the shaft 26 is coupled with the cross-bar or axle 76 of the car through the agency of the shaft 28 and a link 78. The size of the weight 72, as well as the size of the coiled spring 74, may be varied to suit the particular load conditions under which it must operate. A pair of coiled springs 80 (Figures 3 and 4) acting against a wedge member 82 serves to resiliently maintain engagement between the cam teeth 68 and the complementary cam teeth 66. These springs 80 and wedge member or slidable cam 82 are housed within a member 84 secured to the housing 16 in any suitable manner as by means of screws 86.

From the foregoing description it will be apparent that my invention contemplates the provision of an improved control mechanism for the action which takes place between the body or chassis 12 and the axle 76. The described structure is extremely simple in design and hence relatively inexpensive to manufacture. Furthermore, the design is such as to enable the device to remain in service for a long period of time without repair or replacement. Slight adjustments may be made from time to time to vary the compression of the springs 56, but aside from this adjustment, the parts will remain in perfect operating condition over a long period of time. I prefer to provide the rotating disks 40 with polished surfaces, and I also prefer to slightly work the companion or complementary surfaces of the disks 44 before they are assembled with the rotary disks. In this manner I am able to maintain the coefficient of friction substantially constant between the operating parts.

In order to provide an oil-less bearing 24, I prefer to employ either a metal or rubber bushing 88, as clearly shown in Figure 3.

By having the reduced portion of the actuating shaft 26 extending into the cam portion of the arm 70, it cooperates with the wedge member 82 in positively preventing inadvertent axial separation of the cam members 66 and 68. In other words, this arrangement is such that the springs 80 acting through the wedge member 82 are adapted to constantly maintain the cam elements 66 and 68 in frictional engagement.

It will also be apparent from the foregoing description that the device contemplated by my invention is adapted to automatically compensate for any wear. Hence, the necessity for periodic attention is reduced to a minimum. The weight 72 is preferably recessed on opposite sides to render the same adaptable for use with a right-handed or left-handed device. Obviously the size of this weight and the springs may be varied to suit any particular environment in which the shock absorbers are to be used. The parts which cooperate to establish resistance to sudden vertical upward and downward movements of the car body are not subject to variation due to changes in temperature. In other words, the device will operate with the same efficiency regardless of the surrounding temperature.

Obviously the invention contemplates other modifications and changes in the design without departing from the spirit and scope of the appended claims.

Having thus described my invention, what I claim as new and desire to secure by Letters Patent is:

1. A shock absorber including a housing structure, rotary actuating means, stationary means having a friction surface, axially shiftable means having a friction surface to cooperate with the friction surface of the stationary means, said shiftable means being operable in response to movement experienced by said actuating means, constantly urged means coaxially arranged with the stationary means for controlling the frictional engagement of said surfaces under normal operating speeds of said actuating means, and means for controlling said frictional engagement under faster operating speeds of said actuating means.

2. A shock absorber including a housing structure, rotary actuating means, stationary means having a friction surface, rotary means having a friction surface to cooperate with the friction surface of the stationary means, said rotary means being rotatable in response to movement experienced by said actuating means, said friction surfaces being relatively shiftable axially with respect to each other, constantly urged means coaxially arranged with the stationary means for controlling the frictional engagement of said surfaces under normal operating speeds of said actuating means, and means for controlling said frictional engagement under faster operating speeds of said actuating means.

3. A shock absorber including a housing structure, rotary actuating means, stationary means having a friction surface, axially shiftable means having a friction surface to cooperate with the friction surface of the stationary means, said shiftable means being operable in response to movement experienced by said actuating means, constantly urged resilient means coaxially arranged with the stationary means for controlling the frictional engagement of said surfaces under normal operating speeds of said actuating means, and means for controlling said frictional engagement under faster operating speeds of said actuating means.

4. A shock absorber including a housing structure, rotary actuating means, stationary means having a friction surface, axially shiftable means having a lateral friction surface to cooperate with the friction surface of the stationary means, said shiftable means being operable in response to movement experienced by said actuating means, and means including inertia controlled mechanism for controlling the frictional engagement of said surfaces.

5. A shock absorber including a housing structure, rotary actuating means, stationary disk means having a friction surface, shiftable disk means having a friction surface to cooperate with the friction surface of the stationary means, said shiftable means being operable in response to movement experienced by said actuating means, constantly urged means coaxially arranged with the stationary means for controlling the frictional engagement of said surfaces under normal operating speeds of said actuating means, and means for controlling said frictional engagement under faster operating speeds of said actuating means.

6. A shock absorber including a housing structure, rotary actuating means, stationary means having a friction surface, shiftable means having a friction surface to cooperate with the friction surface of the stationary means, said shiftable means being operable in response to movement experienced by said actuating means, means for controlling the frictional engagement of said surfaces under normal operating speeds of said actuating means, and means for controlling said frictional engagement under faster operating speeds of said actuating means, at least one of said control means having a spring-urged cam.

7. A shock absorber including a housing structure, rotary actuating means, stationary disk means having a friction surface, shiftable disk means having a friction surface to cooperate with the friction surface of the stationary means, said shiftable means being operable in response to movement experienced by said actuating means, and means for controlling the frictional engagement of said surfaces, said latter means including diametrically disposed spring elements.

8. A shock absorber including a housing structure, rotary actuating means, stationary means having a friction surface, shiftable means having a friction surface to cooperate with the friction surface of the stationary means, said shiftable means being operable in response to movement experienced by said actuating means, and a constantly urged cam mechanism coaxially arranged with the stationary means for controlling the frictional engagement of said surfaces.

9. A shock absorber including a housing structure, rotary actuating means, stationary means having a friction surface, shiftable means having a friction surface to cooperate with the friction surface of the stationary means, said shiftable means being operable in response to movement experienced by said actuating means, and means for controlling the frictional engagement of said surfaces, said latter means including cam elements resiliently maintained in operative engagement.

10. A shock absorber including a housing structure, rotary actuating means, stationary means having a friction surface, shiftable means having a friction surface to cooperate with the friction surface of the stationary means, said shiftable means being operable in response to movement experienced by said actuating means, means including cam mechanism for controlling the frictional engagement of said surfaces under normal operating speeds of said actuating means, and means including cam mechanism for controlling said frictional engagement under faster operating speeds of said actuating means.

11. A shock absorber including a housing structure, rotary actuating means, stationary disk means having a friction surface, shiftable disk means having a friction surface to cooperate with the friction surface of the stationary means, said shiftable means being operable in response to movement experienced by said actuating means, and means including a spring-urged cam mechanism for relatively shifting said surfaces into engagement whereby to control the frictional resistance established by such engagement.

12. A shock absorber including a housing structure, rotary actuating means, stationary means having a friction surface, shiftable means having a friction surface to cooperate with the friction surface of the stationary means, said shiftable means being operable in response to movement experienced by said actuating means, and means for controlling the frictional engagement of said surfaces including cam mechanism and inertia controlled means for governing the operative effectiveness of said cam mechanism.

13. A shock absorber including a cylindrical housing structure, rotary actuating means including a shaft adapted to be gripped at one extremity thereof, stationary means within the housing having a friction surface, cooperative means within said housing having a friction surface and adapted to be shifted in response to movement experienced by said actuating means, means for controlling the frictional engagement of said surfaces under normal operating speeds of said actuating means including spring operated cam mechanism, and means for controlling said frictional engagement under faster operating speeds of said actuating means.

14. A shock absorber including a cylindrical housing structure, rotary actuating means including a shaft adapted to be gripped at one extremity thereof, stationary means within the housing having a friction surface, cooperative means within said housing having a friction surface and adapted to be shifted in response to movement experienced by said actuating means, means for controlling the frictional engagement of said surfaces under normal operating speeds of said actuating means including spring operated cam mechanism, and means including spring operated cam mechanism for controlling said frictional engagement under faster operating speeds of said actuating means.

ARTHUR C. DAVIDSON.